Nov. 24, 1936.   J. ROCKOFF   2,061,674
ANTIFREEZE RUBBER BELT COMPOUND AND METHOD OF MAKING THE SAME
Filed Feb. 12, 1934

INVENTOR.
Joseph Rockoff
BY
ATTORNEYS

Patented Nov. 24, 1936

2,061,674

UNITED STATES PATENT OFFICE 2,061,674

ANTIFREEZE RUBBER BELT COMPOUND AND METHOD OF MAKING THE SAME

Joseph Rockoff, Dayton, Ohio, assignor to The Dayton Rubber Mfg. Company, Dayton, Ohio, a corporation of Ohio Application February 12, 1934, Serial No. 710,904

4 Claims. (Cl. 106—23)

This invention relates to rubber compounds for use in belt manufacture, and processes of making the same.

The problem encountered by the applicant was to devise a compound for a rubber belt, which would resist excessive hardening under extremely low temperature conditions and thus be free from cracking or breaking under such conditions.

One object of my invention is to provide a rubber compound for the making of belts which will retain pliability under temperature conditions far below the freezing point of water.

Another object is to provide a process of making such a belt compound.

Another object is to provide a rubber compound for belt manufacture, wherein pliability is maintained even under extremely low temperature conditions by reason of its containing an anti-freezing softening oil which has been treated at a temperature far below zero degrees Fahrenheit to remove the ingredients which would otherwise harden the compound at low temperatures.

Another object is to provide a rubber compound which retains its pliability when exposed to ice and snow, as when the belt is used under running conditions wherein it is open to the weather, as in driving a generator from the axles of a railroad car.

The belt made from the rubber compound of my invention finds valuable application to the driving of car-lighting generators from the axles of railway coaches. The belts for driving such generators are customarily unprotected from the weather and are thus subject to extremes of cold and other climatic conditions. The presence of snow and ice, as well as extremely low temperature conditions have hitherto caused the working life of such belts to be short. Under such sub-zero temperatures, the rubber material of the belt hardens and loses its pliability, causing cracks to appear therein and resulting in eventual rupture and breakdown of the apparatus.

In the rubber compound of my invention, I utilize an anti-freezing softening oil which causes the compound to retain its pliability under these low temperature conditions. This oil is of such a nature that it retains its fluidity under such conditions. The oils hitherto used have not possessed this property or else have not been present in sufficient amounts to maintain the pliability.

Figure 1:
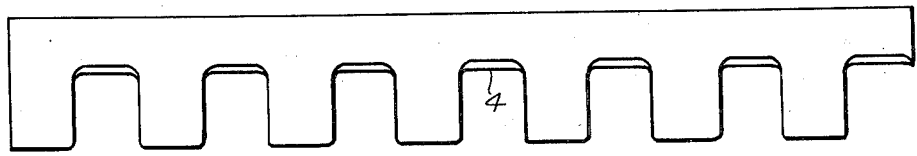
Figure 1 is a side elevation of a belt suitable for use under low temperature conditions, as made from the rubber compound of my invention.

Referring to the drawing in detail, Figure 1 shows a belt of trapezoidal cross section which is made from the rubber compound of my invention and which is adapted to be used under below-freezing climatic conditions or in industrial applications where the belt must operate in extremely cold places. This belt is composed of alternate layers of fabric-and-rubber compound. In the example shown (Figure 3), the alternate layers of fabric are wound in spiral form, the fabric layers 2 being separated from one another by rubber compound layers 3. In the manufacture of such a belt, the rubber impregnated fabric is rolled spirally, after which it is suitably pressed in a mould of trapezoidal cross section to give it the form shown in Figures 1 to 3 inclusive. The belt may be provided with cut-away portions 4 to facilitate its flexing freely when passing around pulleys. It may be used with or without a wrapper 5.

Figure 2:
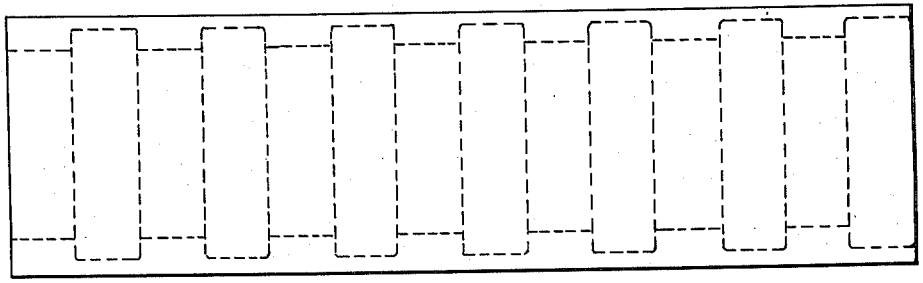
Figure 2 is a plan view of the belt shown in Figure 1.
Figure 3:
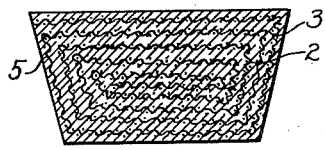
Figure 3 is a cross section through the belt shown in Figure 1.
Figure 6:
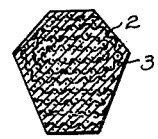
Figure 6 is a cross section through the belt shown in Figure 4.
Figure 4:
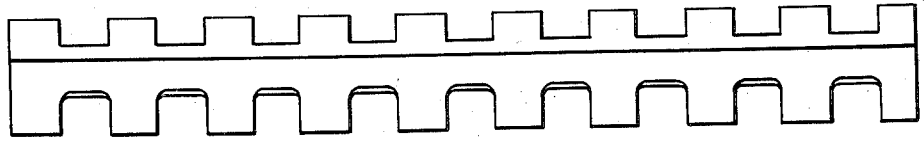
Figure 4 is a side elevation of a modified form of belt of hexagonal cross section also suitable for use under extremely low temperature conditions and utilizing the rubber compound of my invention.
Figure 5:
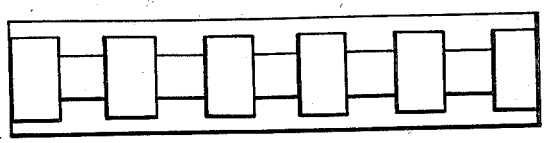
Figure 5 is a top plan view of the belt shown in Figure 4.

The form of belt shown in Figure 4 is of hexagonal cross section, but is otherwise similar in its general mode of use as the trapezoidal belt shown in Figures 1 to 3. In either form of belt, however, the rubber compound employed is the same, and is that of my invention herein disclosed.

In preparing the rubber compound of my invention, I have found the following formula to be suitable:

| Compound— | Pounds |
|---|---|
| Sulfur | 2.7500 |
| Iron oxide | 2.0000 |
| Zinc oxide | 5.0000 |
| Smoke sheet rubber (240 to 280) | 40.3125 |
| Amber crepe (No. 2) rubber (315–345) | 20.0000 |
| Roll brown crepe rubber (not masticated) | 20.0000 |
| Agerite powder (phenyl-beta-naphthylamine) | .6250 |
| Zinc laurate | 1.0000 |
| Anti-freezing softening oil as herein described | 8.0000 |
| 808 accelerator | .3125 |
| | 100.0000 |

The materials in the above batch are mixed in a mill, preferably a 60″ mill. The smoke sheet rubber is pre-masticated to give a plasticity of between 240 and 280 on the Williams type plastometer, an instrument for measuring plasticity, well known to those skilled in the rubber art.

The amber crepe rubber is pre-masticated to give a plasticity of 315 to 345 on the same instrument. The roll Brown crepe rubber is used unmasticated.

The various rubbers mentioned are first "broken down" and the zinc laurate and antifreezing softening oil then added. The "808 accelerator" is used in a 10 percent. master batch, which is broken down or pre-masticated with the original rubbers. This accelerator designated "808" is well known as such to those skilled in the rubber art and is composed of butyraldehyde aniline.

The excess bank is then removed, and the zinc oxide and iron oxide added. The bank is then further trimmed down and the sulfur added. The cut-out is then placed on the mill and the entire batch is cut end-for-end and passed through the bite of the rolls sixteen times. The batch is then slabbed off in the usual manner. The plasticity of the finished batch, according to the above formula, is approximately 137 on the previously mentioned instrument.

The anti-freezing softening oil used in the above process and formula is an oil characterized by the peculiarity that it is treated at temperatures 30 degrees Fahrenheit or more below zero to remove therefrom ingredients which would otherwise harden the rubber compound at low temperatures and cause the belt to crack. A particular oil which I have found suitable is known to those skilled in the art as "medium process de-waxed oil".

This oil is also used in greater percentage quantities than has been customary hitherto in the art. Heretofore, any oil, if used, would not constitute more than two or three per cent. of the batch composition. In my invention, however, the anti-freezing oil is used in quantities of from 5 to 15 per cent., depending on the particular conditions which the belt is intended to meet.

The rubber compound prepared with the low-temperature treated oil is used in manufacturing belts in the ways well known to the prior art. It has been found that with this improved rubber compound, these belts can be run safely under extreme winter conditions in railroad service without breakage or disintegration. Other tests have shown that it is possible to run belts made of this compound at temperatures as low as 80 degrees Fahrenheit below zero, and through solid blocks of ice. Maintaining the pliability of such a belt at such low temperatures becomes an especially pressing problem when small pulleys are to be inter-connected by it, since such pulleys cause the belt to flex considerably during operation.

It will be understood that I desire to comprehend within my invention such modifications as may be necessary to adapt it to varying conditions and uses.

Having thus fully described my invention, what I claim as new and desire to secure by Letters Patent is:

1. A freezing-resisting rubber composition consisting of a rubber compound containing an anti-freezing softening oil which has been treated at a temperature substantially below zero degrees F. to remove ingredients which would otherwise harden the composition at low temperatures whereby to prevent brittleness and retard cracking of the composition at sub-zero temperatures and maintain the flexibility thereof at such temperatures.

2. A freezing-resisting rubber composition consisting of a rubber compound containing an anti-freezing softening oil which has been treated at a temperature substantially thirty degrees F. below zero to remove ingredients which would otherwise harden the composition at low temperatures whereby to prevent brittleness and retard cracking of the composition at sub-zero temperatures and maintain the flexibility thereof at such temperatures.

3. A process of making a freezing-resisting rubber composition comprising mixing the ingredients of a rubber compound and adding thereto an anti-freezing softening oil which has been treated at a temperature substantially below zero degrees F. to remove ingredients which would otherwise harden the composition at low temperatures whereby to prevent brittleness and retard cracking of the composition at sub-zero temperatures and maintain the flexibility thereof at such temperatures.

4. The process of making a freezing-resisting rubber composition comprising mixing the ingredients of a rubber compound and adding thereto an anti-freezing softening oil which has been treated at a temperature substantially thirty degrees F. below zero to remove ingredients which would otherwise harden the composition at low temperatures whereby to prevent brittleness and retard cracking of the composition at sub-zero temperatures and maintain the flexibility thereof at such temperatures.

JOSEPH ROCKOFF.